United States Patent [19]

D'Alessio

[11] E Re. 28,530

[45] Reissued Aug. 26, 1975

[54] DISPLAY CARTON

[75] Inventor: Joseph R. D'Alessio, Lunenburg, Mass.

[73] Assignee: Federal Paper Board Company, Inc., Montvale, N.J.

[22] Filed: Aug. 13, 1973

[21] Appl. No.: 387,886

Related U.S. Patent Documents

Reissue of:

[64] Patent No.: 3,680,687
Issued: Aug. 1, 1972
Appl. No.: 41,806
Filed: June 1, 1970

[52] U.S. Cl. ..... 206/45.14; 229/27
[51] Int. Cl. ..... B65d 5/50; B65d 5/48
[58] Field of Search ..... 206/45.14; 229/27

[56] References Cited

UNITED STATES PATENTS

| | | | |
|---|---|---|---|
| 2,132,632 | 10/1938 | Kondolf | 229/27 |
| 2,170,723 | 8/1939 | Marx | 229/34 HW |
| 3,125,277 | 3/1964 | Kozlowski | 229/27 |
| 3,270,867 | 9/1966 | Hennessey | 206/45.14 |
| 3,361,330 | 1/1968 | Arneson | 206/45.14 UX |
| 3,388,787 | 6/1968 | Growney | 206/45.14 |
| 3,424,299 | 1/1969 | Rosenburg, Jr. | 206/45.14 |

FOREIGN PATENTS OR APPLICATIONS

| | | | |
|---|---|---|---|
| 1,049,905 | 11/1966 | United Kingdom | 206/45.14 |

*Primary Examiner*—Leonard Summer
*Attorney, Agent, or Firm*—Guy A. Greenwalt

[57] ABSTRACT

A shadow box style carton for merchandise, such as a product packaged in a tube or bottle, which carton is formed from a single paperboard blank and which is in the form of a tube with end closure flaps and a partially open front or top through which the merchandise may be viewed, with a portion forming a panel extending inwardly in a diagonal plane from a hinged connection at one side of the opening and connected to an inside wall remote from the hinged connection at the side of the opening so as to leave space for the merchandise and provide display receiving panel space alongside the same. The diagonal panel may have an extension on a portion thereof for cradling a portion of the merchandise so as to better support and retain the same in the carton.

19 Claims, 17 Drawing Figures

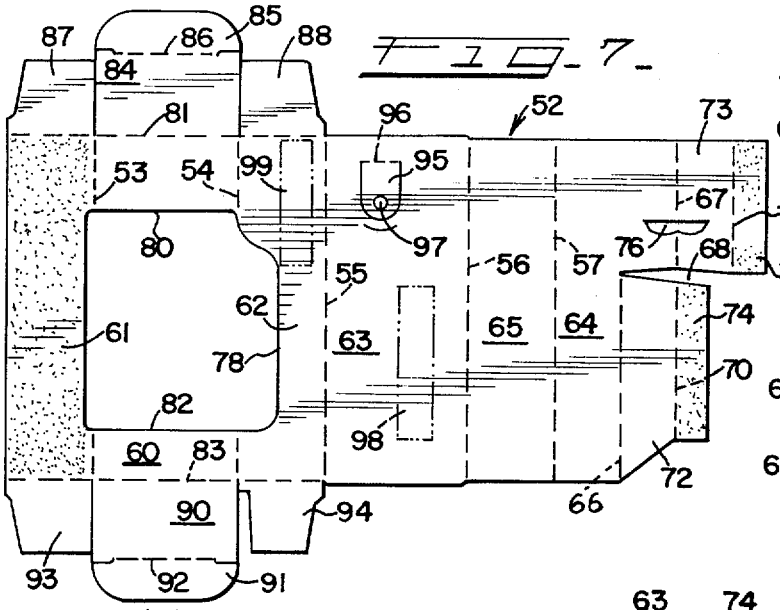
FIG. 7.
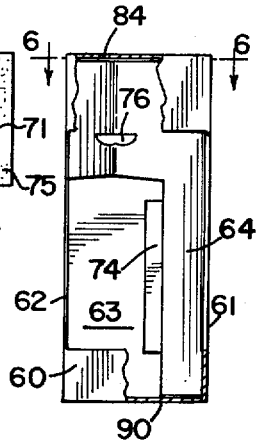
FIG. 5.
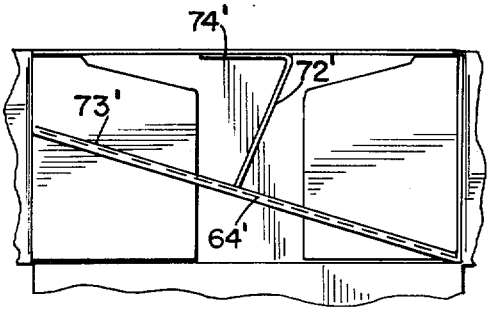
FIG. 9.
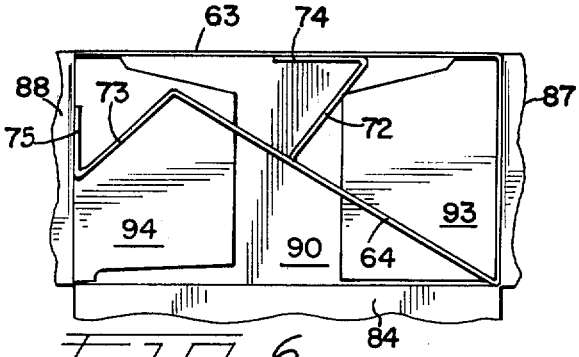
FIG. 6.
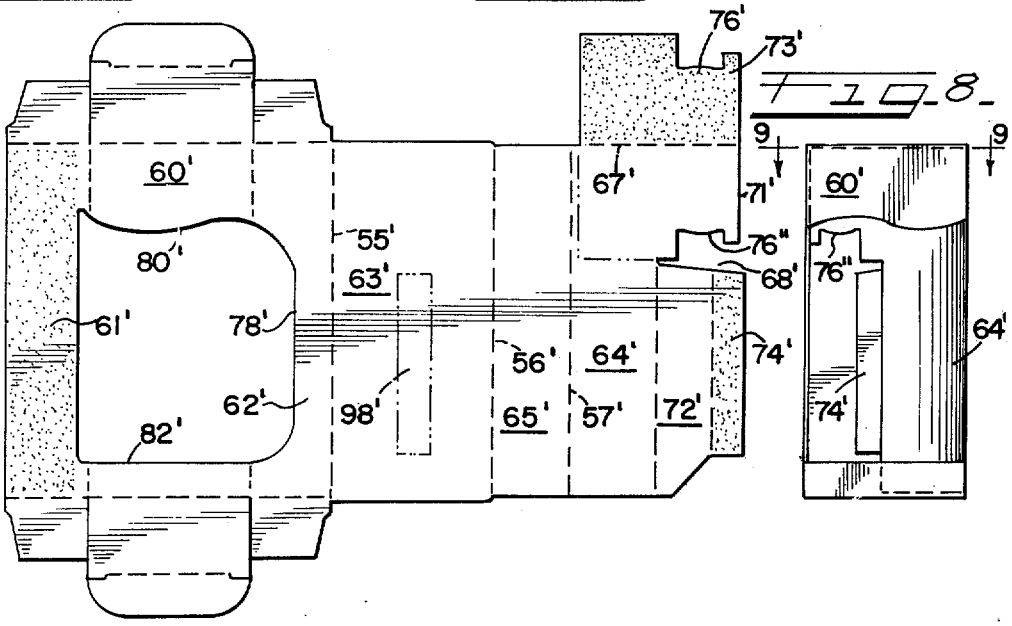
FIG. 8.
FIG. 10.

DISPLAY CARTON

Matter enclosed in heavy brackets [ ] appears in the original patent but forms no part of this reissue specification; matter printed in italics indicates the additions made by reissue.

---

This invention relates to packaging and is more particularly concerned with improvements in a carton formed of paperboard, or other foldable sheet material, for holding and displaying a generally elongate article such as a bottle or tube.

Cartons have heretofore been provided for marketing various articles which have a partially open face through which the article can be observed. Some cartons of this general type, commonly known as shadow boxes, have become popular for holding and displaying products which are adapted for marketing in bottles or tubes. Generally, such cartons have the appearance of a shallow, elongate tray which is adapted to be set upright on a narrow end to display an elongated bottle or tube through an open or partially open side which constitutes the front of the display carton. In some forms the carton has been provided with a means for locking the bottle or tube in the desired position therein. In some styles of this type carton there is provided a single panel back or bottom having side and end walls hinged thereto, one or more of which will incorporate structure forming the retention means for the article. In another form of the carton which is designed for marketing products packed in relatively thin, elongate tubes, one of the broad panels forms the back of the display and the opposite broad panel is cut to form the front and also to provide flaps or other means to retain the articles. Generally, the outside surface of the carton has been relied upon for printing thereon instructions or display material relevant to the use or advantages of the product which is being marketed.

It is a general object of the present invention to provide a carton of the type referred to for use in the marketing of bottled or tubed products which may be formed with a high degree of economy from a single blank of paperboard or similar material, which has provision for retaining the bottle or tube in the desired position, which has adequate provision for accompanying display material, and which has a neat and attractive appearance.

A more specific object of the invention is to provide a shadow box style display carton for articles such as tubes or bottles wherein provision is made for holding the tube or bottle in a predetermined position so as to attractively display the same and wherein provision is made for display advertising or illustration of the use of the product along one side thereof without increasing the size of the carton to an undesirable degree while retaining the article therein in an attractive manner.

Another object of the invention is to provide a display carton having the general form of a tray with interconnected side and end walls which carry co-operating bottom or back forming panels and also front and display forming panels which carton is adapted for rapid setting up and loading on high speed automatic equipment.

A still further object of the invention is to provide a display carton having the general form of a tray, with an open front or top, and with means for retaining the article to be displayed therein which is in the form of supplemental panels extending diagonally from the one side edge of the opening in the front or top to a reverse fold intermediate the side edges of the back panel, which provides space in which the article is cradled and also space alongside the same for instructions in the use of the article, or display material of a desired character.

These and other objects and advantages of the invention will be apparent from a consideration of the several forms of the carton which are illustrated in the accompanying drawings wherein:

FIG. 5 is a front elevation, with portions broken away, of a modified form of the carton;

FIG. 6 is a cross section taken on the line 6—6 of FIG. 5, to an enlarged scale, with the end closure flaps shown in open position and partially broken away;

FIG. 7 is a plan view of the inside face of the blank which is employed in fabricating the carton of FIG. 5;

FIG. 8 is a front elevation of another modified form of the carton which embodies the invention;

FIG. 9 is a cross section taken on the line 9—9 of FIG. 8, to an enlarged scale, with the end closure flaps shown in open position and partially broken away;

FIG. 10 is a plan view of the inside face of a paperboard blank which is employed in fabricating the carton of FIG. 8;

Figure 3:
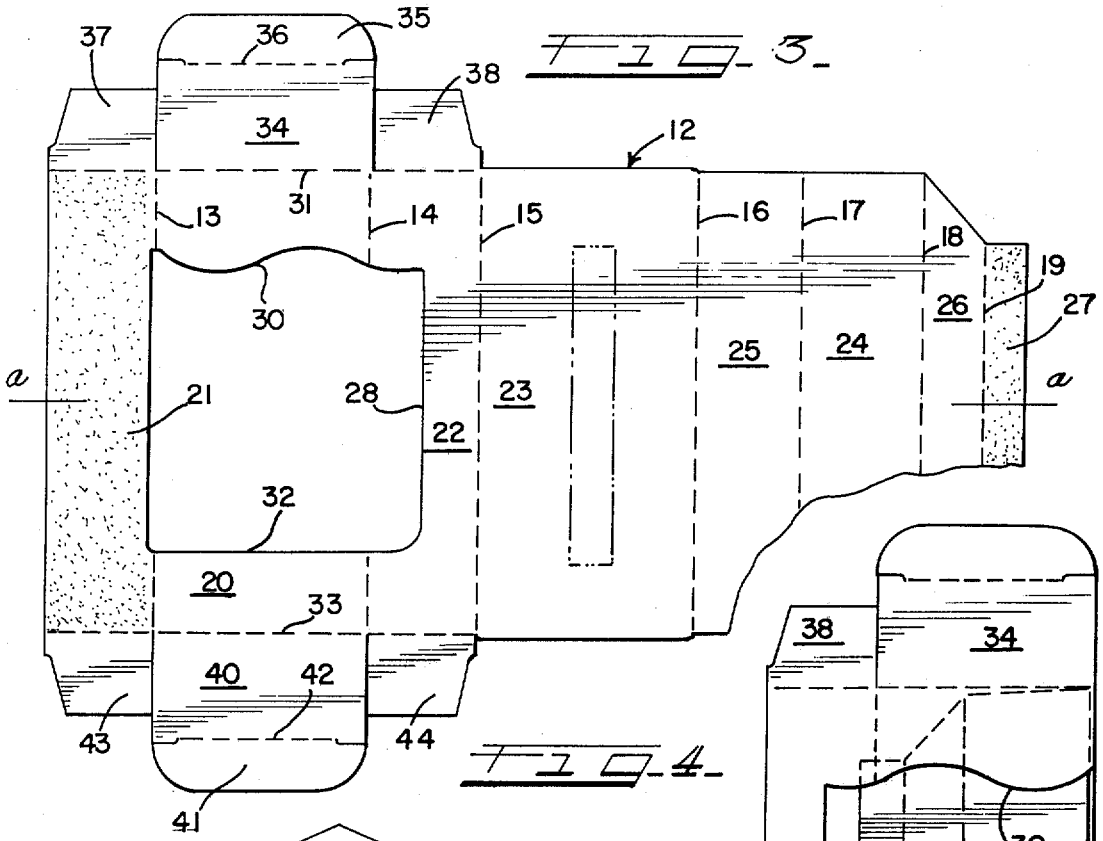
FIG. 3 is a plan view, with portions broken away, showing the inside face of the blank which is employed in fabricating the carton of FIG. 1.

Referring first to the carton 10 which is illustrated in FIGS. 1 to 4, the carton is fabricated from a generally rectangular paperboard blank 12 which is cut and scored as shown in FIG. 3. The cut and scored blank 12 is generally symmetrical about the line indicated at a—a. The blank 12 is divided by parallel, transverse score lines 13, 14, 15, 16, 17, 18 and 19 into a front wall forming panel 20, adjoining side wall forming panels 21 and 22, and a back wall panel 23 which extends between the transverse score lines 15 and 16 and is separated by the latter from an extended end section of the blank which is subdivided by score lines 17, 18 and 19 to provide a display panel 24, a side wall reinforcing panel 25, a partition panel 26, and a glue panel or glue tab 27, the last two panels constituting the end section of the blank and being cut away at the ends, as indicated, to reduce the length thereof. The front wall panel 20 and the one adjacent side wall panel 22 are cut away to provide the opening 28. In the form shown, the top edge of the opening 28 is on a curve 30 as shown and spaced inwardly of the score line 31 while the opposite edge of the opening 28, which is indicated at 32, is spaced inwardly of the score line 33, the latter being parallel with the score line 31 and these two score lines defining top and bottom corners of the carton. A top closing flap 34 extends outwardly of the score line 31 and has a tuck-in panel 35 separated therefrom by the hinge forming score line 36. End flaps 37 and 38 are provided as hinged extensions of the side wall forming panels 21 and 22. At the opposite side of the blank a bottom closing tuck-in flap 40 is provided with a tucking panel 41 separated therefrom by the hinge forming score line 42, and two end flaps 43 and 44 extend outwardly of the score line 33 as extensions of the side wall panels 21 and 22.

Figure 4:
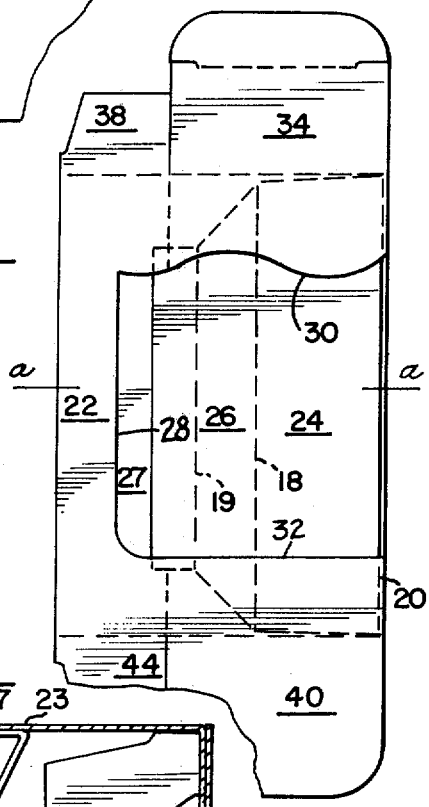
FIG. 4 is a plan view, with portions broken away, illustrating the carton of FIG. 1 in collapsed condition.
Figure 1:
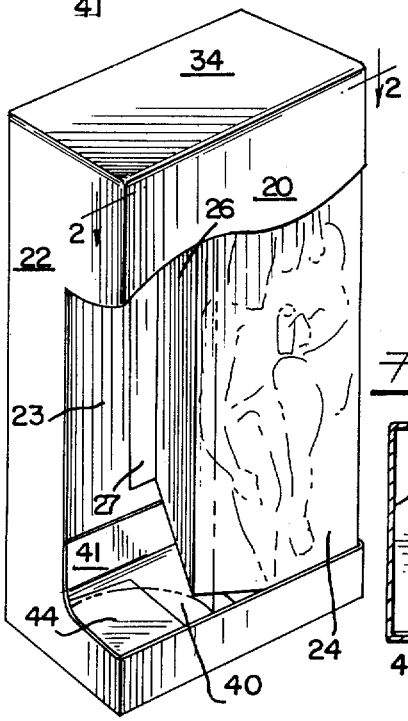
FIG. 1 is a perspective view of a display carton in set up and closed condition which embodies the principal features of the invention.
Figure 2:
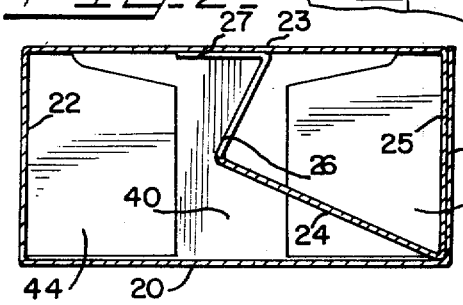
FIG. 2 is a cross section taken on line 2—2 of FIG. 1, to an enlarged scale.

Preparatory to setting up the carton the cut and scored blank is provided with an adhesive, as shown in FIG. 4, the adhesive being applied to the inside face of the one side wall panel 21 and the glue flap 27, as indicated. The end section of the blank is folded inwardly about the score line 17 to bring the inside surface of the tab 27 onto the area indicated by dot and dash lines in the center portion of the back or bottom forming panel 23. The blank is folded next about the score line 15 so that the previously folded portion overlies the panels 20 and 22 after which the side wall panel 21 is folded over onto the outside face of the reinforcing panel 25. This is the form in which the carton is delivered to the user for filling and closing. It is, of course, adapted to be opened up into tubular form in an obvious manner after which the tube or bottle or other merchandise is inserted in the space between the panels 26 and 22, the former acting as a cradle-like retention base for holding the article against sidewise movement. The top and bottom article surfaces are restrained against movement by folding in the top and bottom end panels 37, 38 and 43, 44 and tucking in the closure flaps 34 and 40, respectively. The article is further restrained against removal from the carton by the portions of the front panel 20 and the side wall panel 22 which are at the top and bottom of the opening 28. The panel 24 and, if desired, the panel 26 may be decorated or provided with illustrative or advertising material as desired.

In the form of the carton which is illustrated in FIGS. 5 to 7, the blank 52 is cut and scored as shown in FIG. 7. It is divided by score lines 53, 54, 55 and 56 to provide a front wall panel 60, adjoining side wall forming panels 61 and 62, a back wall panel 63, and an end section which is subdivided by score line 57 to provide a display forming panel 64 and a side wall reinforcing panel 65, the latter extending between the score lines 56 and 57. The display forming panel 64 has a lower extension, as viewed in FIG. 7, separated therefrom by a score line 66 which score line is parallel with the score line 57 and an upper extension which is separated from the main portion of the panel 64 by a score line 67, the latter being parallel with the score line 57 and being offset from the score line 66 in the direction of the end of the blank. The upper and lower extensions are separated by cut slot 68 and subdivided by the parallel and offset score lines 70 and 71 to provide the panels 72 and 73 and the glue panels or flaps 74 and 75. A small aperture 76 is cut in the upper extension panel which straddles the score line 67. The front wall forming panel 60 and the adjoining side wall panel 62 are cut away to provide the opening 78 with the top edge 80 spaced inwardly of the score line 81 and the bottom edge 82 spaced inwardly of the score line 83. A top closing flap 84 extends outwardly of the score line 81 with a tuck-in panel or flap 85 separated therefrom by the hinge forming score line 86. End flaps 87 and 88 are provided which are hinged extensions of the side wall panels 61 and 62. At the opposite side of the blank a bottom closing flap 90 is provided with a tucking panel 91 separated therefrom by score line 92 and end flaps 93 and 94 extend outwardly of the score line 83 as extensions of the side wall panels 61 and 62. A small rectangular flap 95 is cut in the back wall forming panel 63 which may be hinged outwardly on the score line 96 with an aperture 97 so as to permit the carton to be hung from a rod on a display rack.

In setting up the carton of FIG. 5, an adhesive is applied to the side wall panel 61, to the inside face of the glue flap 74, and to the outside face of the glue flap 75, or in the glue areas indicated in dot and dash lines at 98 and 99 on the inside faces of the panels 63 and 62. In folding the blank to form the collapsed carton the end section is folded about the score line 57 which brings the same into overlying relation with the panels 63 and 65 so that the glue tab 74 is adhered to the panel 63 as indicated by the glue area 98. The folded portion is then folded about the score line 55 into overlying relation with the panels 62 and 60 and finally the panel 61 is folded about the score line 53 into overlying relation with the panel 65. This completes the folding of the blank into collapsed container form.

When the blank is set up for filling, the display panel 64 (FIG. 6) extends diagonally inwardly from the edge of the opening in the front and side wall panels 60 and 62 with the lower portion having the panel 72 and glue flap 74 reversely folded and the glue flap 74 attached to the back wall 63 and with the upper portion having the panel 73 bent outwardly about the score line 67 and the glue flap 75 attached to the inside face of the side wall 62. This provides a cradle-like space for the body of the bottle or other article between the panel 72 and the side wall 62 and a top engaging cradle-like portion at the top of the carton, for engaging a cap or closure member on the article, which is provided by the top portion of the panel 64 and the hinged panel 73.

The carton illustrated in FIGS. 8, 9 and 10 embodies a modification of the carton of FIGS. 5 to 7 and corresponding parts thereof will be indicated by the same numerals primed. The blank for fabricating this form of the carton is cut and scored as shown in FIG. 10. It may be cut and scored the same as with respect to the blank of FIG. 7 except for the upper portion, as viewed in FIG. 10, of the display panel 64'. In this form of the carton the display panel 64' is provided in the upper portion thereof with a double thickness by an extension panel 73' and the glue tab (75 in FIG. 7) is omitted. The reinforcing extension panel 73' which is generally rectangular and which is taken from the material at the side margin of the blank is hinged on the score line 67'. Alternatively, the panel 73' may be obtained employing a blank of greater length and cutting the material at the end to provide the panel 73' which would then be hinged on a score line corresponding approximately to the cutting line indicated at 71'. The outermost side edge of the panel 73' is cut away at 76' and a corresponding cut 76'' is made in the opposite edge of the panel 73' which is the topmost edge defining the slot 68', the latter separating the two extensions of the panel 64'.

In fabricating the carton from the blank of FIG. 10, the reinforcing panel 73' is provided with an adhesive and folded about the score line 67' into overlying engagement with the top or uppermost portion of the display panel 64'. The end portion of the blank is then folded about the score line 57' to [ being ] *bring* the glue tab 74' into engagement with the inside face of the bottom or back panel 63' in the area indicated by the numeral 98'. The folded portion of the blank is then folded about the score line [55] *55'* which brings it into overlying relation with the panels 60' and 62' after which the panel 61' is folded on the score line 53' into overlying engagement with the side wall reinforcing panel 65' and adhered thereto. This completes the fabrication of the carton which may be thereafter opened up and filled.

When opened up, as shown in FIG. 9, the upper end portion of the display panel 64' extends in the plane of the main portion of the panel 64' with the free edge thereof adjacent the side wall 62' and with the slot formed by the cutouts 76' and 76'' opening in the direction of the bottom end of the carton and being available for engagement with the cap or closure on the container, or the top of the article which the carton is designed to accommodate, for holding the article against endwise movement. This carton is particularly designed for marketing a relatively slender aerosol-type container.

Figure 11:
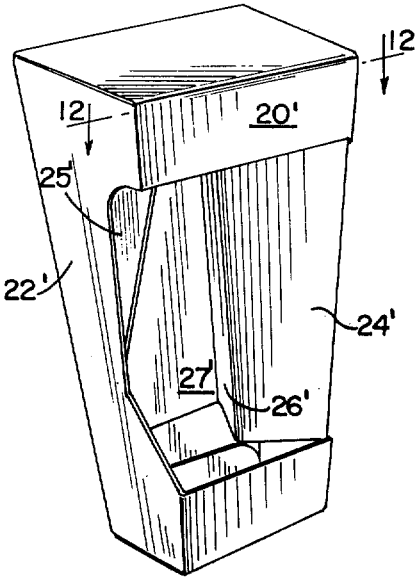
FIG. 11 is a perspective view of a further modified form of the carton.
Figure 12:
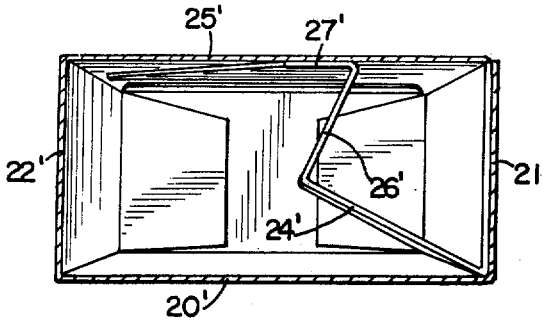
FIG. 12 is a cross section taken on the line 12—12 of FIG. 11, to an enlarged scale.
Figure 13:
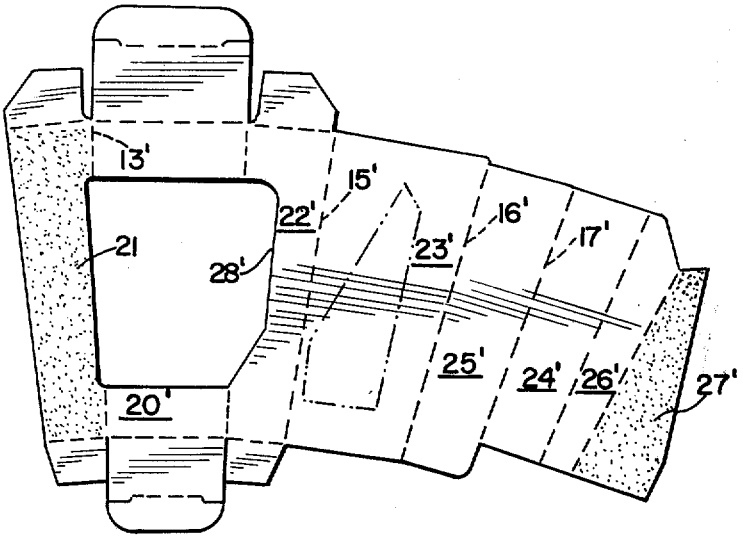
FIG. 13 is a plan view of a paperboard blank which is cut and scored for fabricating the carton of FIG. 11.

The form of the carton shown in FIGS. 11, 12 and 13, is essentially a modification of the shape of the carton shown in FIGS. 1 to 4. The blank for this form of the carton is cut and scored as shown in FIG. 13. Since the principal difference in this blank, as compared with the blank in FIG. 3, is in the arrangement of the cutting and scoring lines so as to give the finished carton the tapered configuration or shape shown in FIG. 11, corresponding lines and panels are identified by the same numerals primed. Except for the taper referred to there is no substantial difference in the panels in the carton wall forming portion of the blank, that is, in the panels indicated at 21', 20', 22' and 25' and the associated end closure panels, while the shadow forming panels 24', 26' and 27' are modified slightly. These panels are reduced in size by cutting away a portion of the side margin of the blank and glue tab 27' is changed somewhat as to size and shape as shown in FIG. 13. The carton is set up in collapsed condition in the same manner as the carton of FIGS. 1 to 4, the folding being on the lines 17', 15' and 13', in the order mentioned.

Figure 14:
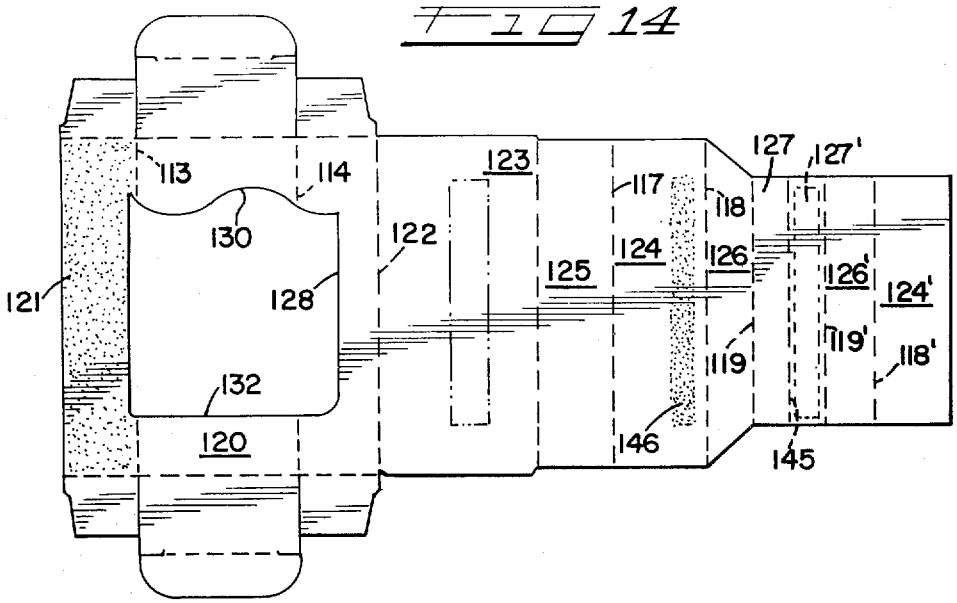
FIG. 14 is a plan view of a blank employed in fabricating a further modified form of the carton.
Figure 15:
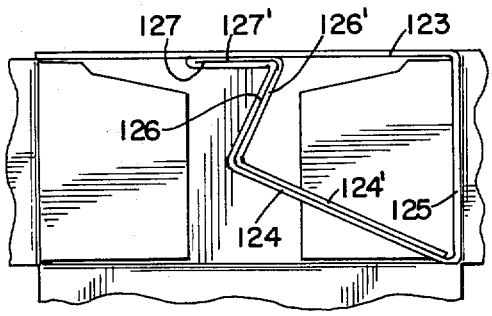
FIG. 15 is a top plan view of the carton which is fabricated from the blank of FIG. 14, with the top end closure flaps in open position and partially broken away.

Another modification of the carton of FIGS. 1 to 4, is illustrated in FIGS. 14 and 15. In this form of the carton the blank for fabricating the same is cut and scored as shown in FIG. 14. The left hand portion of the blank, as viewed in FIG. 14, is the same as the corresponding portion of the blank of FIG. 3, and the score lines and panel constituting this portion of the blank are identified by the same numerals plus 100. The blank as shown in FIG. 14 is cut and scored so that the right end portion of the blank, which is extended, may be folded to double the thickness of the main portion of the diagonal panel which forms the shadow panel. The difference in the blanks lies in the extension of the glue tab panel 27 of the blank of FIG. 3 to provide enough material for reinforcing by a double thickness the panels 24, 25 and 26 of FIG. 3. The panels 127', 126' and 124' which extend beyond the panel 127 are provided to reinforce the panels 127, 126 and 124, respectively. All the other panels are the same as in the form of the blank shown in FIG. 3. The reinforcing or stiffening panels 127', 126' and 124' are obtained by extending the blank and dividing the extended portion by the parallel score lines 118' and 119' which, when the end of the blank is folded about the score line 145 separating the panels 127 and 127', are adapted to overlie the score lines 119 and 118. One or more lines of adhesive or spots of adhesive, as indicated at 146, are provided for holding the folded end portion of the blank while it passes through a straight line gluing machine. After the folding of the end portion of the blank on the line 145 the remaining folding and gluing operations are the same as described with respect to the blank of FIG. 3. This form of the carton provides a stiffer, more rigid diagonal panel and reinforces and rigidifies the carton.

Figure 16:
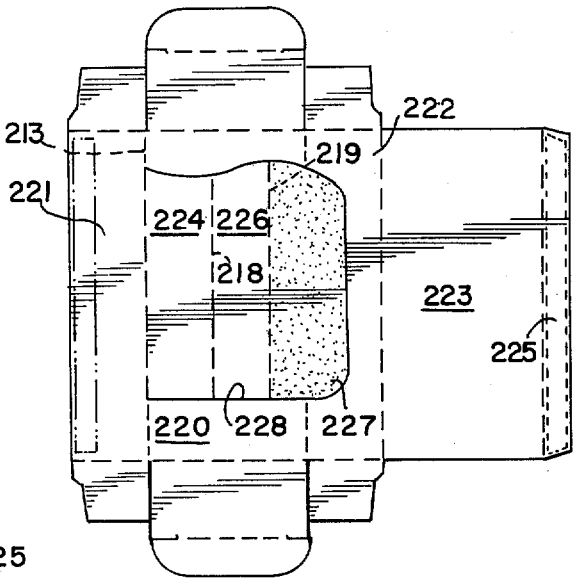
FIG. 16 is a plan view of a blank employed in fabricating a still further modified form of the carton.
Figure 17:
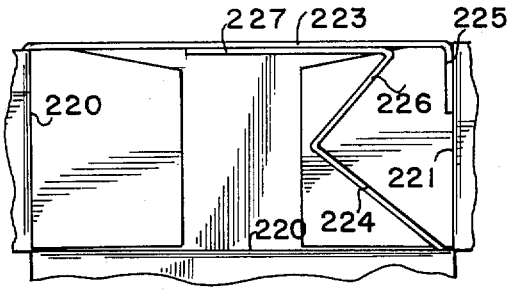
FIG. 17 is a top plan view of the carton which is formed from the blank of 16 with the top end closure flaps in open position and partially broken away.

A still further modified form of the carton is shown in FIGS. 16 and 17. The blank for fabricating this form of the carton which is cut and scored as shown in FIG. 16 is of substantially less length than the blank in FIG. 3 and the diagonal shadow panel is taken out of the front and adjoining side wall panels in providing the opening therein. The blank is cut and scored much the same as the blank in FIG. 3 and corresponding score lines and panels are identified by the same numerals plus 200. The panel 225 which corresponds to the panel 25 in FIG. 3 is reduced in width and constitutes the one end of the blank. The panels 224, 226 and 227, which form the shadow panel assembly, are taken from the material in that portion of the blank which is cut to form the opening 228 in the front and adjoining side wall, the material being left connected to the side wall panel 221 on the score line 213 and being subdivided by the score lines 218 and 219 to form the panels 224 and 226 and the glue tab or panel 227. In fabricating the carton in knocked down or collapsed condition, the back wall forming panel 223 and the attached panel 225 are folded into overlying relation on the panels 220 and 222 and adhesive is applied, or has been previously applied, to the outside face of the panel 225, so that upon folding over the panel 221 onto the panel 225 these two panels will adhere together. The glue tab 227 adheres to the inside face of the back panel 223 and when the carton is opened up the shadow panels 224 and 226 will assume the same position as the panels 24 and 26 in FIG. 2.

While the end closure panels or flaps are shown integrally hinged to the front and side wall panels in all forms of the carton illustrated, the arrangement of these panels may be varied so that one of them will be hinged to the back wall. The hanging tab 95 which is shown in connection with the form of the carton in FIGS. 5 to 7 may be incorporated in any one of the other forms of the carton if desired. It will be appreciated that the dimensions and shape of the opening in the front wall of the carton may be varied depending upon the nature of the article which is to be enclosed in the carton. Also, the type of adhesive which may be employed is subject to variation and the panels may be spotted or striped with the adhesive where it is desired to hold them together either for passage through the folding and gluing machines or for attaching the same to other panels in the carton. The relative dimensions of the carton walls will, in each instance, depend largely on the dimensions of the article which the carton is intended to accommodate.

I claim:

1. A rectangular carton formed of a one piece blank of bendable sheet material which is cut and creased to provide, when set up on end, a back wall, adjoining side walls hinged thereto, a front wall hingedly connecting the side walls and having an opening therein which is formed by cutting out a substantial area intermediate the top and bottom edges thereof, end closure flaps hinged to the sides and to one of said back or front walls, and a single shadow forming panel hingedly connected to a side wall at a side of said front wall opening which is adjacent the connection of the front wall and one side wall, said shadow forming panel being disposed at least in part in a vertical plane extending from its hinged connection with said side wall diagonally inwardly of said front wall and in the direction of the opposite side wall and said back wall, at least a portion of the inner margin of said shadow forming panel being reversely folded so as to provide a panel disposed in a plane extending diagonally relative to the plane of the front wall and in the direction of the back wall and the side wall to which the shadow forming panel is hinged and glue tab means for securing the terminus thereof to the inside face of the back wall intermediate the side edges of said back wall thereby providing space between said reversely folded panel portion and said opposite side wall of the carton for accommodating an article, which space is bounded by said reversely folded inner margin portion of said shadow forming panel, said opposite side wall and the interconnecting portion of the back wall, and also providing a single inwardly inclined shadow panel having the edge fold which connects said panel and the reversely folded portion thereof extending into said article accommodating space so as to restrain the article when positioned in said space against sidewise movement and providing a panel surface of maximum width extending alongside said space for receiving advertising material or the like.

2. A collapsible carton formed of a one piece blank of bendable sheet material which is cut and creased to provide, when set up on end, a tubular body having a back wall, adjoining side walls hinged thereto, a front wall hingedly connected to forward edges of the side walls and having an opening therein which is formed by cutting out a substantial area intermediate the top and bottom edges thereof, top and bottom end closure flaps hinged to the sides and one of said back or front walls, and a shadow forming panel hingedly connected at a side of said front wall opening on a hinge line which substantially coincides with the hinge line of the connection of the front wall and said one side wall, said shadow forming panel being disposed in a plane extending diagonally inwardly of said opening and in the direction of the back wall of the opposite side wall, at least a portion of the inner margin of said shadow forming panel being reversely folded on a line and in the direction of said one side wall and said back wall so that it is disposed in a vertical plane extending from its hinged connection with said shadow forming panel diagonally between the front and back walls and in the direction of said one side wall and a glue tab securing the terminus of said portion of said inner margin of said shadow forming panel to the inside face of the back wall intermediate the side edges of said back wall thereby providing space for positioning therein an article which space extends between said reversely folded inner marginal portion of said shadow forming panel and said opposite side wall and providing also a single panel surface of substantial width extending diagonally and in a vertical plane from said line of reverse fold to the hinge connection of said shadow panel with said one side wall for receiving display material or the like, said shadow panel having the inner vertical edge thereof which is hingedly connected to said reversely folded marginal portion extending into the space for the article so as to reduce the width of the front opening into said space and restrain the article against sidewise movement when it is positioned in said space.

3. A collapsible carton as set forth in claim 2 wherein said opening in said front wall has top and bottom edges which are spaced at least in part a substantial distance from the top and bottom corner edges of the carton so as to provide top and bottom front wall portions of substantial depth which are adapted to retain the article in the carton and prevent accidental movement of the article through said opening.

4. A collapsible carton as set forth in claim 3 wherein said back wall, said side walls and said front wall are each tapered in the direction of the top and bottom and said shadow forming panel has the bottom end thereof cut away so as to leave a clear space at the bottom end thereof.

5. A collapsible carton as set forth in claim 2 wherein said shadow forming panel is derived at least in part from said front wall and in part from said opposite side wall.

6. A collapsible carton as set forth in claim 2 wherein said shadow panel has a marginal portion folded onto the panel so as to provide a double thickness of material.

7. A collapsible carton as set forth in claim 2 wherein said shadow panel has at least a portion thereof reinforced by an additional panel which is derived from adjoining material in the blank and which is folded back upon adjoining portions of said shadow panel.

8. A collapsible carton as set forth in claim 2 and said shadow panel having an inner portion at the top thereof which extends in a common plane to a point approaching said opposite side wall and which has a double thickness, the dimension of said extended portion in the direction of said opposite side wall being sufficient to engage the top of an article positioned in the space between said inner marginal portion of said shadow panel and said opposite side wall so as to restrain the article against vertical movement.

9. A collapsible carton as set forth in claim 2 and said shadow panel having an inner portion of the top thereof which is disposed in the plane of the main portion of said shadow panel, which extends in the direction of said opposite side wall and which has a connecting flap secured to said opposite side wall intermediate the front and back edges of said side wall.

10. A collapsible carton as set forth in claim 2 and said shadow panel having a portion forming an inner extension at the top thereof which is reversely folded and which has its end secured to said opposite side wall on a vertical hinge line intermediate the front and back edges thereof and said extension having a slot cut therein for engaging therein a portion of the top of an article so as to retain the article against vertical movement in said carton.

11. A collapsible carton as set forth in claim 2 and said shadow panel having a portion forming an inner extension at the top thereof which is disposed in the plane of the main portion of said shadow panel and which has a slot cut in the lower edge thereof for engaging therein a top portion of an article so as to retain the article against vertical movement in the carton.

12. An elongate generally rectangular one piece carton blank of bendable sheet material which is divided by parallel score lines, which extend transversely of the blank, into a back wall forming panel, adjoining side wall forming panels, a front wall forming panel extending from one of said side wall forming panels, said front wall panel having an opening therein which is formed by cutting out a substantial area thereof intermediate the side edges of said blank, and a shadow panel structure extending from the transverse score line defining an edge of the side wall forming panel which is remote from said front wall panel, said shadow panel structure being subdivided by a longitudinal cutting line to provide top and bottom forming marginal portions which are in turn divided by parallel score lines which extend tranversely of the blank, so as to provide each with a marginal panel portion and an associated glue tab portion, said tab portion having a substantially greater dimension in the direction longitudinally of the blank and said side and front wall panels having end extensions divided therefrom by parallel score lines which extend longitudinally of the blank and which end extensions constitute end closure flap forming panels taken from material along side margins of the blank.

13. An elongate generally rectangular one piece carton blank as set forth in claim 12 and said shadow panel structure constituting one end portion of said blank.

14. A collapsible carton formed of a one piece blank of bendable sheet material which is cut and creased to provide, when set up on end, a back wall, adjoining side walls hinged thereto, a front wall hingedly connected to the side walls and having an opening therein which is formed by cutting out a substantial area intermediate the top and bottom edges thereof, end closure flaps hinged to the side and back or front walls, and a shadow forming panel hingedly connected at a side of said front wall opening which is adjacent the connection of the front wall and one side wall, said shadow forming panel extending inwardly of said opening and in the direction of the opposite side wall, at least a portion of the inner margin of said shadow forming panel being folded in the direction of said one side wall and said back wall and means for securing the terminus thereof to the inside face of the back wall intermediate the side edges of said back wall and said shadow forming panel having an extended portion which is secured to said opposite side wall intermediate the hinged connection of said opposite side wall with said back and front walls, thereby providing space for positioning an article between said shadow forming panel and said opposite side wall and providing also a panel surface of appreciable width extending along the inner side of said article when an article is positioned therein for receiving display material or the like.

15. A collapsible carton formed of a one piece blank of bendable sheet material which is cut and creased to provide, when set up on end, a back wall, adjoining side walls hinged thereto, a front wall hingedly connected to the side walls and having an opening therein which is formed by cutting out a substantial area intermediate the top and bottom edges thereof, end closure flaps hinged to the side and back or front walls, and a shadow forming panel hingedly connected at a side of said front wall opening which is adjacent the connection of the front wall and one side wall, said shadow forming panel extending inwardly of said opening and in the direction of the opposite side wall, at least a portion of the inner margin of said shadow forming panel being folded in the direction of said one side wall and said back wall and means for securing the terminus thereof to the inside face of the back wall intermediate the side edges of said back wall thereby providing space for positioning an article between said shadow forming panel and said opposide side wall and providing also a panel surface of appreciable width extending along the inner side of said article when an article is positioned therein for receiving display material or the like, and said shadow forming panel having an extended portion with the margin thereof folded in the direction of the front wall and having its terminus secured to said opposite side wall so as to form a cradle like support for an end portion of the article.

*16. A collapsible carton formed of a one piece blank of bendable sheet material which is cut and creased to provide, when set up on end, a tubular body having a back wall, adjoining side walls hinged thereto, a front wall hingedly connected to forward edges of the side walls and having an opening therein which is formed by cutting out a substantial area intermediate the top and bottom edges thereof, top and bottom end closure flaps hinged to the sides and one of said back or front walls, and a shadow forming panel hingedly connected at a side of said front wall opening on a hinge line which substantially coincides with the hinge line of the connection of the front wall and said one side wall, said shadow forming panel being disposed in a plane extending diagonally inwardly of said opening and in the direction of the back wall and the opposite side wall, at least a portion of the inner margin of said shadow forming panel being reversely folded so as to extend in the direction of said one side wall and said back wall where it is disposed in a vertical plane extending from its hinged connection with said shadow forming panel diagonally between the front and back walls and a panel hinged to said reversely folded portion for securing the terminus of said reversely folded portion so that it is disposed in a fixed position relative to the inside face of the back wall with said panel overlying a portion of the inside face of said back wall intermediate the side edges thereof so as to provide space for positioning therein an article, which space extends between said reversely folded panel portion and said opposite side wall and providing also a single shadow panel surface of substantial width extending diagonally and in a vertical plane from said line of reverse fold to the hinge connection of said shadow panel with said one side wall for receiving display material or the like, said shadow panel having the inner vertical edge thereof, which is hingedly connected to said reversely folded marginal portion, disposed so as to define one side of the front opening into said space and serving to restrain the article against sidewise movement when it is positioned in said space.*

*17. A rectangular carton formed of a one piece blank of bendable sheet material which is cut and creased to provide, when set up on end, a back wall, adjoining side walls hinged thereto, a front wall hingedly connecting the*

*side walls and having an opening therein which is formed by cutting out a substantial area intermediate the top and bottom edges thereof, end closure flaps hinged to the sides and to one of said back or front walls, and a single shadow forming panel hingedly connected to a side wall at a side of said front wall opening which is adjacent the connection of the front wall and one side wall, said shadow forming panel being disposed at least in part in a vertical plane extending from its hinged connection with said side wall diagonally inwardly of said front wall and in the direction of the opposite side wall and said back wall, at least a portion of the inner margin of said shadow forming panel being reversely folded so as to provide a panel portion which is disposed in a plane extending in the direction of the back wall and a further panel portion forming a means for securing the terminus thereof relative to the inside face of the back wall which further panel portion lies at least in part, along the inside face of said back wall in said set up condition of the carton thereby providing space of substantial width between said reversely folded panel portion and said opposite side wall of the carton for accommodating an article, which space is bounded on one side by said reversely folded inner margin portion of said shadow forming panel and extends to said opposite side wall, and also providing a single inwardly inclined shadow panel having the edge fold which connects said panel and the reversely folded panel portion thereof defining in part said space for accommodating said article so as to restrain the article when positioned in said space against sidewise movement and providing a panel surface of maximum width extending alongside said space for receiving advertising material or the like.*

*18. A collapsible carton as set forth in claim 17 wherein said shadow panel has an inner portion at the top thereof which extends in part in the plane of the main portion of said shadow panel and in part in the direction of said front wall and said opposite side wall so as to form a cradle for a top portion of an article positioned in said article accommodating space.*

*19. A collapsible carton as set forth in claim 17 wherein said shadow panel has an inner portion at the top thereof which is stiffened by an additional thickness of material and which extends in the plane of the main portion of said shadow panel and towards said opposite side wall a distance sufficient to engage top portions of an article positioned in the space between said reversely folded panel portion and said opposite side wall so as to restrain the article against vertical movement.*

* * * * *